(12) United States Patent
Coldrey et al.

(10) Patent No.: US 11,569,559 B2
(45) Date of Patent: Jan. 31, 2023

(54) METHOD FOR RESTORING A MICROWAVE LINK

(71) Applicant: Telefonaktiebolaget LM Ericsson (publ), Stockholm (SE)

(72) Inventors: Mikael Coldrey, Borås (SE); Andreas Nilsson, Gothenburg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 556 days.

(21) Appl. No.: 16/608,458

(22) PCT Filed: Apr. 28, 2017

(86) PCT No.: PCT/EP2017/060235
§ 371 (c)(1),
(2) Date: Oct. 25, 2019

(87) PCT Pub. No.: WO2018/197004
PCT Pub. Date: Nov. 1, 2018

(65) Prior Publication Data
US 2020/0058979 A1    Feb. 20, 2020

(51) Int. Cl.
*H01Q 1/02* (2006.01)
*H04W 24/02* (2009.01)

(52) U.S. Cl.
CPC .............. *H01Q 1/02* (2013.01); *H04W 24/02* (2013.01); *B64C 2201/14* (2013.01)

(58) Field of Classification Search
CPC ...... H01Q 1/02; H04W 24/02; B64C 2201/14
See application file for complete search history.

(56) References Cited

U.S. PATENT DOCUMENTS

| 4,926,186 A | * | 5/1990 | Kelly | ............... | H01Q 3/267 |
| | | | | | 342/173 |
| 8,305,277 B2 | * | 11/2012 | Reams | ............... | H01Q 19/13 |
| | | | | | 343/840 |

OTHER PUBLICATIONS

International Search Report and Written Opinion issued in International Application No. PCT/EP2017/060235, dated Jan. 15, 2018 (10 pages).

(Continued)

*Primary Examiner* — Andrea Lindgren Baltzell
(74) *Attorney, Agent, or Firm* — Rothwell, Figg, Ernst & Manbeck, P.C.

(57) ABSTRACT

A method (10) for restoring a microwave link is provided. The method (10) is performed by a network entity (7) and comprises receiving (11) information from a node (3) controlling a microwave antenna (5), the information indicating that an obstacle is at least partly obscuring the microwave antenna (5), and instructing (12), based on the received information, an unmanned aerial vehicle (6) adapted for maintenance work to fly to a given location for removing the obstacle on the microwave antenna (5). A method (40) in a network node (3), a method (70) in an unmanned aerial vehicle (6) and devices are also provided.

20 Claims, 4 Drawing Sheets

(56) References Cited

OTHER PUBLICATIONS

TRK Group, Case Studies, Microwave Tower, Emergency Repair Challenge, http://www.trkgroup.ca/connect/case-studies/, Mar. 1, 2016 (3 pages).
Sajid Nazir et al., "WISE—a satellite-based system for remote monitoring", International Journal of Satellite Communications and Networking—Wiley Online Library, First published: Feb. 17, 2016 (22 pages).
TH. Achammer et al., "Snow dielectric properties: from DC to microwave X-band", Annals of Glaciology, vol. 19, Jun. 1, 1994 (5 pages).

* cited by examiner

METHOD FOR RESTORING A MICROWAVE LINK

TECHNICAL FIELD

The technology disclosed herein relates generally to the field of wireless communication, and in particular to methods for restoring a microwave link, network entity, network entity, unmanned aerial vehicle, computer programs and computer program products.

BACKGROUND

Increasing demand for mobile broadband creates increased capacity requirements in air interface as well as in a backhaul network. The backhaul network comprises links interconnecting access nodes (e.g. base stations) and connecting access nodes to core network nodes. Microwave backhaul is one option that can be used for meeting this increasing demand, as microwave backhaul has high performance and low cost of ownership.

One drawback is that microwave link antennas may get icy in cold weather which creates a misalignment of the narrow beams, and hence deteriorate the backhaul link performance. Maintenance personnel then need to get to the antenna for removing the ice and restoring its function, which is a time-consuming and costly handling.

SUMMARY

An objective of the present disclosure is to address and improve various aspects for backhaul links. A particular objective is to enable a reliable microwave backhaul. This objective and others are achieved by the methods, nodes, entities, computer programs and computer program products according to the appended independent claims, and by the embodiments according to the dependent claims.

The objective is according to an aspect achieved by a method for restoring a microwave link. The method is performed by a network entity and comprises receiving information from a node controlling a microwave antenna, the information indicating that an obstacle is at least partly obscuring the microwave antenna. The method comprises instructing, based on the received information, an unmanned aerial vehicle adapted for maintenance work to fly to a given location for removing the obstacle on the microwave antenna.

The method provides several advantages. For instance, the performance of a microwave link will be robust even in cold weather and this can be achieved in an automatic manner, without involvement of maintenance personnel.

The objective is according to an aspect achieved by a computer program for a network entity for restoring a microwave link. The computer program comprises computer program code, which, when run on at processing circuitry of the network entity causes the network entity to perform the method as above.

The objective is according to an aspect achieved by a computer program product comprising a computer program as above and a computer readable means on which the computer program is stored.

The objective is according to an aspect achieved by a network entity for restoring a microwave link. The network entity is configured to: receive information from a node controlling a microwave antenna, the information indicating that an obstacle is at least partly obscuring the microwave antenna, and instruct, based on the received information, an unmanned aerial vehicle adapted for maintenance work to fly to a given location for removing the obstacle on the microwave antenna.

The objective is according to an aspect achieved by a method for restoring a microwave link. The method is performed by a network node controlling a microwave antenna and comprises: detecting that an obstacle is at least partly obscuring the microwave antenna, and sending, to a network entity, information indicating that an obstacle is at least partly obscuring the microwave antenna.

The objective is according to an aspect achieved by a computer program for a network node for restoring a microwave link. The computer program comprises computer program code, which, when run on at processing circuitry of the network node causes the network node to perform the method as above.

The objective is according to an aspect achieved by a computer program product comprising a computer program as above and a computer readable means on which the computer program is stored.

The objective is according to an aspect achieved by a network node for restoring a microwave link. The network node controls a microwave antenna and is configured to: detect that an obstacle is at least partly obscuring the microwave antenna, and send, to a network entity, information indicating that an obstacle is at least partly obscuring the microwave antenna.

The objective is according to an aspect achieved by a method performed by an unmanned aerial vehicle for restoring a microwave link. The method comprises receiving, from a network entity, instructions to fly to a given geographical location, and removing an obstacle at least partly obscuring a microwave antenna, the microwave antenna residing at the given geographical location.

The objective is according to an aspect achieved by a computer program for an unmanned aerial vehicle for restoring a microwave link. The computer program comprises computer program code, which, when run on at processing circuitry of the unmanned aerial vehicle causes the unmanned aerial vehicle to perform the method as above.

The objective is according to an aspect achieved by a computer program product comprising a computer program as above and a computer readable means on which the computer program is stored.

The objective is according to an aspect achieved by an unmanned aerial vehicle for restoring a microwave link. The unmanned aerial vehicle is configured to receive, from a network entity instructions to fly to a given geographical location, and remove an obstacle at least partly obscuring a microwave antenna, the microwave antenna residing at the given geographical location.

Further features and advantages of the embodiments of the present teachings will become clear upon reading the following description and the accompanying drawings.

DETAILED DESCRIPTION

Figure 1A:
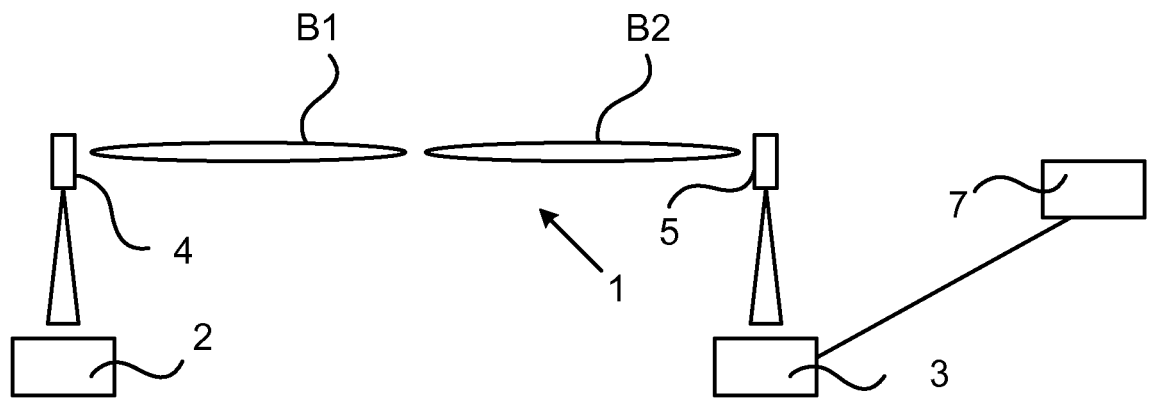
FIG. 1 illustrates schematically an environment in which embodiments according to the present teachings may be implemented.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

Unmanned aerial vehicles (UAV), often denoted drones, are becoming more and more common and used for various purposes. Drones may, for instance, be used in aerial surveillance, professional aerial surveying, commercial and motion picture filmmaking, news gathering for journalism, observation by police forces, search and rescue operations, scientific research, disaster relief, cargo transportation etc. The small unmanned-aircraft-systems are rapidly becoming a large market, including services and applications. The present teachings take advantage of such UAVs for solving at least the mentioned problem of microwave antennas easily getting icy.

Briefly, a node controlling a microwave link may detect that there is, for instance, ice on an antenna and that the ice deteriorates the microwave link performance. The node may then send a command to a node or entity in a network about the problem. In response, the network entity may then send signals to a dedicated drone ordering it to travel to the identified microwave link antenna and spray, for instance, de-freeze substance or use other means for appropriately de-icing the antenna.

Figure 1B:
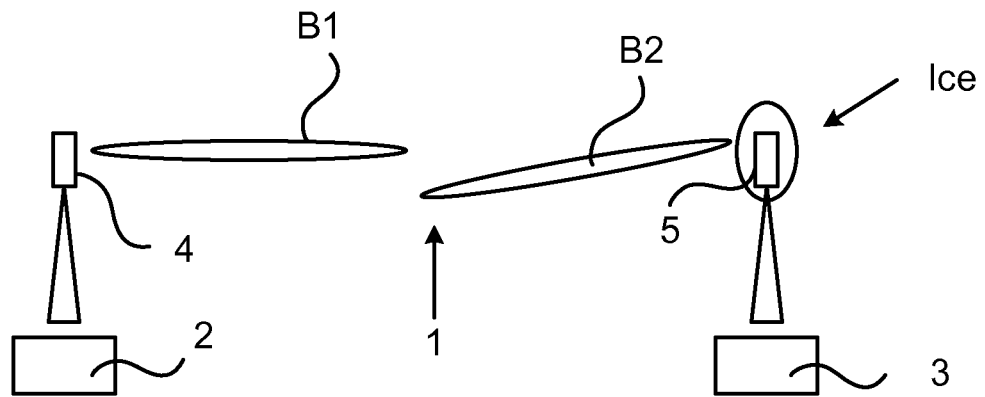
Figure 1C:
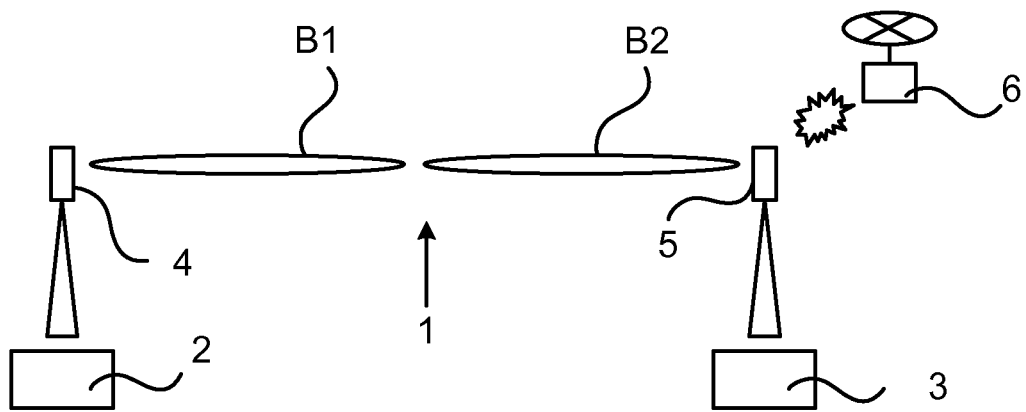

FIGS. 1a, 1b, 1c illustrate schematically an environment in which embodiments according to the present teachings may be implemented. As mentioned in the background section, microwave links may be used as backhaul links and they should be able to support very high data rates with high availability.

FIG. 1a illustrates a microwave link 1 comprising two high gain narrow beams B1, B2 that can fulfill the above requirements. The microwave link 1 is used as a backhaul link between a first node 2 and a second node 3, each having a respective microwave antenna 4, 5. The first node 2 has a first microwave antenna 4 and the second node 3 has a second microwave antenna 5. The first and second nodes 2, 3 may, for instance, be radio access nodes such as an gigabit node B (gNB), an evolved node B or a base station. The high gain narrow beams B1, B2 between the first and second nodes 2, 3 should be aligned, as illustrated in FIG. 1a.

However, the high gain narrow beams B1, B2 may become misaligned as shown in FIG. 1b. The misalignment may have occurred due to ice that has got stuck on one of the antennas 4, 5 that provides the microwave link, which in the illustrated case is the second antenna 5. The ice on a second microwave link antenna 5 causes the second narrow high gain beam B2 to become misaligned with the first high gain beam B1, and therefore the performance of the microwave link 1 between the two antennas 4, 5 deteriorates.

To resolve this, the ice is removed by an unmanned aerial vehicle 6 (denoted drone in the following). The drone 6 may remove the ice e.g. by spraying some defreeze substance or by using some other means for removing the ice on the second microwave link antenna 5, such that the high gain beam B2 is aligned again.

FIG. 1c illustrates that the misalignment problem has been resolved and the high gain narrow beams B1, B2 are again aligned, i.e. the microwave link 1 is functional again. In the following several embodiments are described by steps in which different entities co-operate.

In a first step the second node 3 detects that it has ice on its antenna 5 which deteriorates the performance of the microwave link 1. The detection of the ice may be performed in many different ways, for example by using different sensors, such as for instance, a temperature sensor in combination with detecting that the microwave link 1 is performing poorly.

In a second step the affected second node 3 may inform a network entity 7 about its problem. The network entity 7 may, for instance, be a node of a core network, a cloud server or a virtual machine running on a server. The information may comprise coordinates of the second node 3. In other embodiments, the coordinates for the second node 3 may already be stored in the network entity 7 and the second node 3 signals an identification number identifying itself.

In a third next step the network entity 7 may signal a drone 6 adapted for maintenance work, such as ice removal. The drone 6 may, for instance, be adapted such that it is provided with equipment enabling ice removal. Examples of such equipment comprise using a de-freeze substance, an electric blanket for warming the antenna 5 or a mechanical removal device. The network entity 7 may instruct the drone 6 to fly to the given coordinates and remove the ice on the microwave link antenna 5.

In an embodiment the second node 3 detects that the ice has been removed and signals to the drone 6, directly or via the network entity 7, that the ice is removed and that the performance of the microwave link is restored.

In an embodiment there is a drone 6 charging station close to the nodes 2, 3 having the microwave link 1. Such charging station may be installed by using the electricity supply to the node 2, 3. Such drone charging station extends the operation time of the ice removing drone 6.

In an embodiment the ice removal is performed in a preventive manner, such that based, for instance, on the weather and previous statistics of ice building on the node 2, 3 having a microwave link 1, the drone 6 flies around and removes the ice before it gets so much ice on the microwave antenna 4, 5 that the performance is deteriorated.

In an embodiment a de-freeze substance is sprayed by the drone 6 on the microwave antenna 4, 5, similar as is done to remove ice on cars windscreens or to defrost airplanes in cold weather.

In an embodiment the ice is removed by placing a warm electric blanket over the microwave antenna 4, 5 of the nodes 2, 3. If needed, such electric blanket may also take advantage of the drone charging station close to the nodes 2, 3, and be charged by the drone charging station in order to extend the operating time of the electric blanket.

Figure 2:
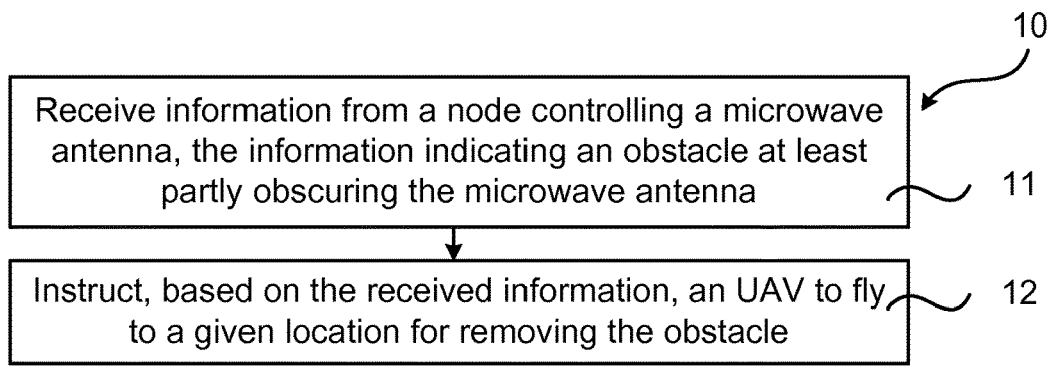
FIG. 2 illustrates a flow chart over steps of an embodiment of a method in a network entity in accordance with the present teachings.

The features and embodiments that have been described can be combined in many different ways, examples of which are given next with reference first to FIG. 2.

FIG. 2 illustrates a flow chart over steps of an embodiment of a method in an network entity in accordance with the present teachings.

A method 10 for restoring a microwave link is provided. The method 10 is performed by a network entity 7. The method 10 comprises receiving 11 information from a node 3 that is controlling a microwave antenna 5, e.g. the node 3 as described in relation to FIG. 1. The information indicates that an obstacle is at least partly obscuring the microwave antenna 5, and may, for instance, comprise an indication on deteriorating performance of the microwave link provided by the node 3 and the microwave antenna 5.

The method 10 comprises instructing 12, based on the received information, an unmanned aerial vehicle 6 to fly to a given location for removing the obstacle on the microwave antenna 5. The unmanned aerial vehicle 6 is adapted for such maintenance work, as is described more in detail in relation to e.g. FIG. 9.

The method 10 for restoring a microwave link can be implemented in a network node, e.g. located in a core network or in a cloud environment. The method 10 may be performed by the network entity 7 and comprises receiving information from a node 3 that is controlling the microwave antenna 5, informing about an obstacle that is, at least partly, obscuring the microwave antenna 5, and reducing performance of the microwave link which the microwave antenna 5 is part of. The obstacle may typically be ice and/or snow, but could also be another, rarer obstacle such as e.g. a bird-nest, a balloon, paper or other trash that has gotten stuck on the microwave antenna 5.

In various embodiments, the information indicating that an obstacle is at least partly obscuring the microwave antenna 5 comprises one or more of: temperature in the vicinity of the microwave antenna 5, performance indicator of a microwave link 1 provided by the microwave antenna 5, and weather forecasts at the location of the microwave antenna 5. Several other ways of indicating that the microwave antenna 5 is partly or entirely covered by some obstacle are conceivable.

In various embodiments, the receiving 11 information from the node 3 further comprises one or both of: information identifying the node 3 or information on location of node 3. As has been described earlier, the node 3 reporting about its microwave antenna 5 being obscured can include a node identifier in the information message. This node identifier enables the network entity 7 to find the location of the node 3, e.g. from a table or the like. In other embodiments, also described earlier, the node 3 may include its location in the information message (or as a separate message), e.g. in the form of geographical coordinates.

In various embodiments, the method 10 comprises detecting that the unmanned aerial vehicle 6 is low on battery and instructing the unmanned aerial vehicle 6 to fly to a charging station.

In various embodiments, the obstacle comprises one or both of ice and snow. Ice and snow is a problem in particular for microwave antennas, and the method 10 provides a convenient and cost-efficient way of overcoming this problem, not requiring maintenance personnel to actually go to the node site.

In various embodiments, the method 10 comprises instructing the unmanned aerial vehicle 6 to take preventive action by instructing it to remove ice on the microwave antenna 5. Such preventive action might even be done before the ice deteriorates the performance of the microwave link 1 too much. The network entity 7 may base such preventive action on various information received from one or more sources. Examples on such information comprise weather forecasts (received e.g. from an application providing such information), information on link performance as received from the node 3, and temperature values received from temperature sensors arranged in the vicinity of the microwave antenna 5.

Figure 3:
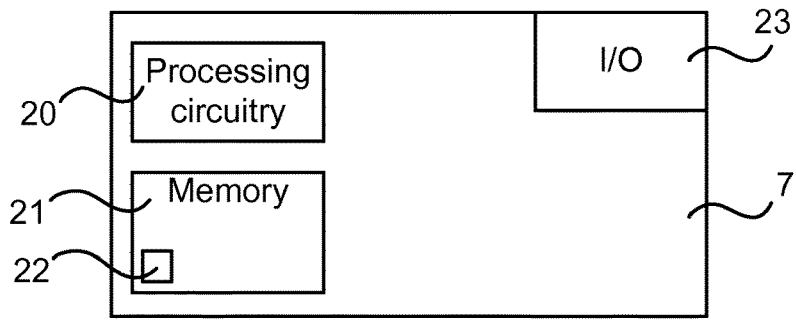
FIG. 3 illustrates schematically a network entity and means for implementing embodiments of the method in accordance with the present teachings.

FIG. 3 illustrates schematically a network entity 7 and means for implementing embodiments of the method in accordance with the present teachings.

The network entity 7 comprises processing circuitry 20, which may be any combination of one or more of a suitable central processing unit (CPU), multiprocessor, microcontroller, digital signal processor (DSP), etc., capable of executing software instructions stored in a computer program product 21, e.g. in the form of a storage medium 21. The processing circuitry 20 may further be provided as at least one application specific integrated circuit (ASIC), or field programmable gate array (FPGA).

The processing circuitry 20 is configured to cause the network entity 7 to perform a set of operations, or steps, e.g. as described in relation to FIG. 2. For example, the storage medium 21 may store the set of operations, and the processing circuitry 20 may be configured to retrieve the set of operations from the storage medium 21 to cause the network entity 7 to perform the set of operations. The set of operations may be provided as a set of executable instructions. The processing circuitry 20 is thereby arranged to execute methods as disclosed herein.

The storage medium 21 may also comprise persistent storage, which, for example, can be any single one or combination of magnetic memory, optical memory, solid state memory or even remotely mounted memory.

The network entity 7 also comprises an input/output means 23 for communicating wirelessly and/or in a wired manned with other entities and devices. The input/output means 23 may, for instance, comprise a protocol stack, for communication with a node 3 that is controlling a microwave antenna 5. The input/output means 23 may be used for receiving data input and for outputting data, e.g. receiving information and/or sending instructions. The input/output means 23 may comprise receiving circuitry and transmitting circuitry. The network entity 7 may also comprise an antenna device for wireless communication with the node 3.

A network entity 7 is provided for restoring a microwave link. The network entity 7 is configured to:
  receive information from a node 3 controlling a microwave antenna 5, the information indicating that an obstacle is at least partly obscuring the microwave antenna 5, and
  instruct, based on the received information, an unmanned aerial vehicle 6 adapted for maintenance work to fly to a given location for removing the obstacle on the microwave antenna 5.

The network entity 7 may be configured to perform the above steps, and implement any of the described embodiments of the method 10, e.g. by comprising one or more processors 20 (or processing circuitry) and memory 21, the memory 21 containing instructions executable by the processor 20, whereby the network entity 7 is operative to perform the steps.

In an embodiment thus, a network entity 7 for restoring a microwave link is provided. The network entity 7 comprises one or more processors 20 and memory 21, the memory 21 containing instructions executable by the processor 20, whereby the network entity is operative to: receive information from a node controlling a microwave antenna, the information indicating that an obstacle is at least partly obscuring the microwave antenna, and instruct, based on the received information, an unmanned aerial vehicle adapted for maintenance work to fly to a given location for removing the obstacle on the microwave antenna.

In different embodiments, the information indicating that an obstacle is at least partly obscuring the microwave antenna 5 comprises one or more of: temperature at the vicinity of the microwave antenna 5, performance indicator of a microwave link 1 provided by the microwave antenna 5, and weather forecasts at the location of the microwave antenna 5.

In various embodiments, the information from the node 3 further comprises one or both of: information identifying the node 3 or information on location of node 3.

In various embodiments, the network entity 7 is configured to detect that the unmanned aerial vehicle 6 is low on battery and to instruct the unmanned aerial vehicle 6 to fly to a charging station.

In various embodiments, the obstacle comprises one or both of ice and snow.

In various embodiments, the network entity 7 is configured to instruct the unmanned aerial vehicle 6 to take preventive action by instructing it to remove ice on the microwave antenna 5.

Figure 4:
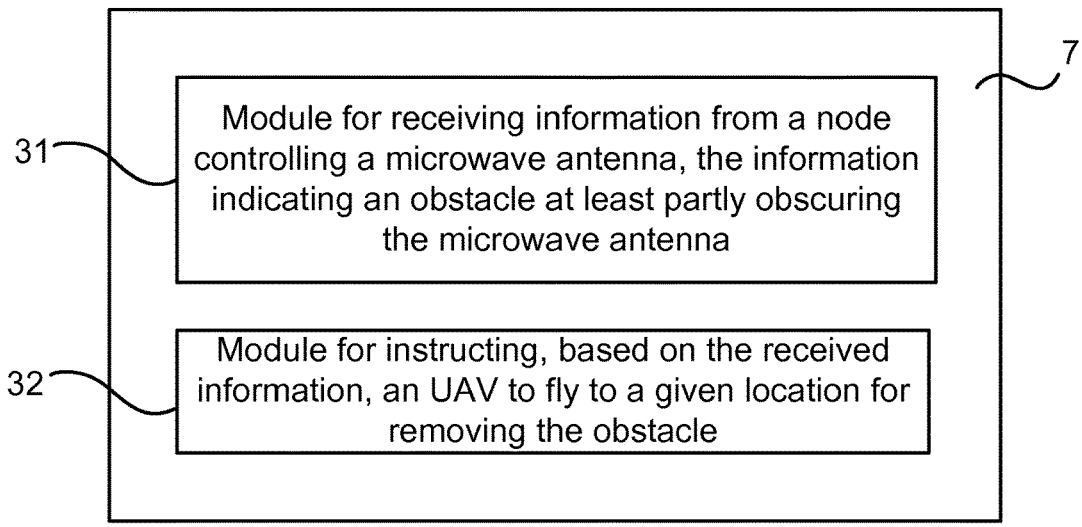
FIG. 4 illustrates a network entity comprising function modules/software modules for implementing embodiments of the present teachings.

FIG. 4 illustrates a network entity 7 comprising function modules/software modules for implementing embodiments of the present teachings. The function modules can be implemented using software instructions such as computer program executing in a processor and/or using hardware, such as application specific integrated circuits (ASICs), field programmable gate arrays, discrete logical components etc., and any combination thereof. Processing circuitry may be provided, which may be adaptable and in particular adapted to perform any of the steps of the method 10 that has been described in various embodiments.

A network entity 7 is provided for restoring a microwave link. The network entity 7 comprises a first module 31 for receiving information from a node controlling a microwave antenna, the information indicating that an obstacle is at least partly obscuring the microwave antenna. Such first module 31 may, for instance, comprise receiving circuitry or an input device.

The network entity 7 comprises a second module 32 for instructing, based on the received information, an unmanned aerial vehicle adapted for maintenance work to fly to a given location for removing the obstacle on the microwave antenna. Such second module 32 may, for instance, comprise transmitting circuitry or an output device.

The network entity 7 may also comprise one or more modules for being capable of receiving and processing a combination of input, e.g. inputs such information from the node 3, 4 and data from a database.

It is noted that one or both of the modules 31, 32 may be replaced by units.

Figure 5:
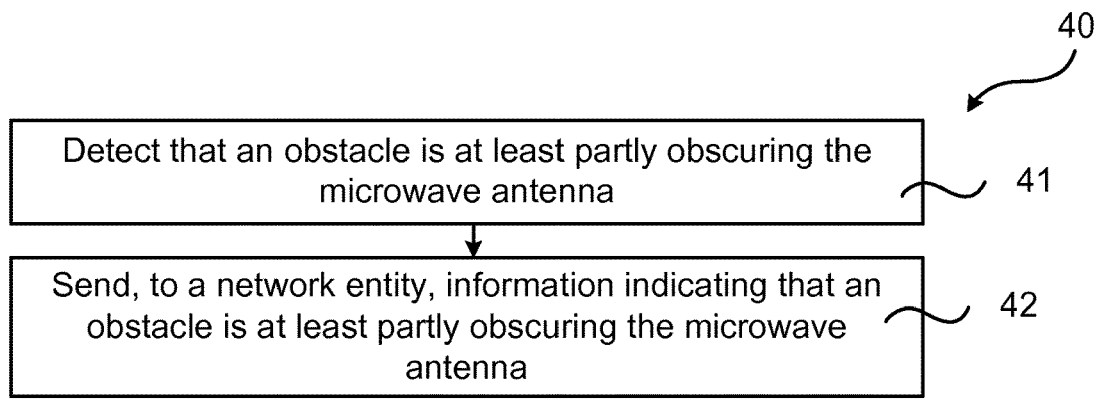
FIG. 5 illustrates a flow chart over steps of an embodiment of a method in a node in accordance with the present teachings.

FIG. 5 illustrates a flow chart over steps of an embodiment of a method in a node in accordance with the present teachings.

A method 40 for restoring a microwave link is provided. The method 40 may be performed by a network node 3 that is controlling a microwave antenna 5. The method 40 comprises detecting 41 that an obstacle is at least partly obscuring the microwave antenna 5.

The method 40 comprises sending 42, to a network entity 7, information indicating that an obstacle is at least partly obscuring the microwave antenna 5.

In an embodiment, the detecting 41 comprises detecting deterioration of microwave backhaul link 1 to a neighboring network node 2.

In various embodiments, the detecting 41 is based on one or more of: temperature, performance of microwave antenna 5, statistics on ice building on the microwave antenna 5.

In various embodiments, the method 40 comprises sending with the information indicating that an obstacle is at least partly obscuring the microwave antenna 5 also one or both of: an identification identifying the network node 3 and geographical coordinates of the network node 3. In such embodiments, the network entity 7 receiving the information about the obstacle can swiftly find the geographic location of the network node 3 having problem with the microwave link and can thus quickly direct an unmanned vehicle 6 to the network node 3 for removing the obstacle and thereby restore the microwave link.

Figure 6:
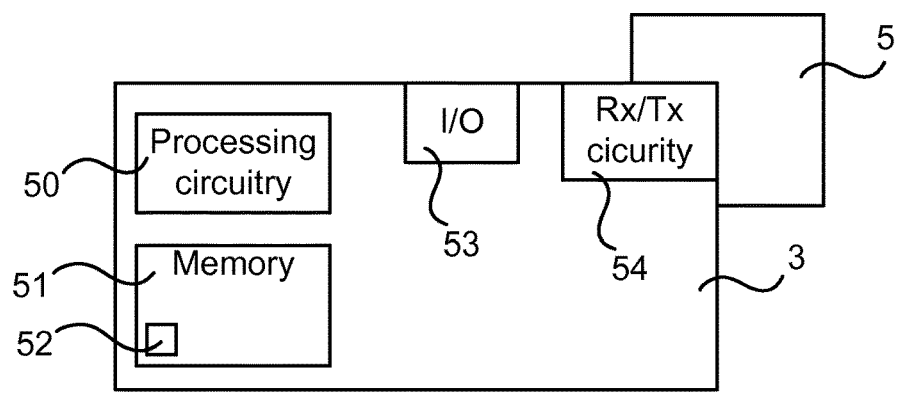
FIG. 6 illustrates schematically a node and means for implementing embodiments of the method in accordance with the present teachings.

FIG. 6 illustrates schematically a node and means for implementing embodiments of the method in accordance with the present teachings. The network node 3 comprises processing circuitry 50, which may be any combination of one or more of a suitable central processing unit (CPU), multiprocessor, microcontroller, digital signal processor (DSP), etc., capable of executing software instructions stored in a computer program product 51, e.g. in the form of a storage medium 51. The processing circuitry 50 may further be provided as at least one application specific integrated circuit (ASIC), or field programmable gate array (FPGA).

The processing circuitry 50 is configured to cause the network node 3 to perform a set of operations, or steps, e.g. as described in relation to FIG. 5. For example, the storage medium 51 may store the set of operations, and the processing circuitry 50 may be configured to retrieve the set of operations from the storage medium 51 to cause the network node 3 to perform the set of operations. The set of operations may be provided as a set of executable instructions. The processing circuitry 50 is thereby arranged to execute methods as disclosed herein.

The storage medium 51 may also comprise persistent storage, which, for example, can be any single one or combination of magnetic memory, optical memory, solid state memory or even remotely mounted memory.

The network node 3 also comprises an input/output means 53 for communicating wirelessly and/or in a wired manned with other entities and devices. The input/output means 53 may, for instance, comprise a protocol stack, for communication with a network entity 7 in a wired or wireless manner. The input/output means 53 may be used for receiving data input and for outputting data, e.g. receiving and/or sending information. The network node 3 may comprise receiving circuitry and transmitting circuitry 54. The network node 3 may also comprise or be connected to an antenna device 5, e.g. microwave antenna, for wireless communication with wireless devices over a wireless link.

A network node 3 is provided for restoring a microwave link. The network node 3 is arranged to control a microwave antenna 5, providing for instance a backhaul link.

The network node 3 is configured to:
  detect that an obstacle is at least partly obscuring the microwave antenna 5, and
  send, to a network entity 7, information indicating that an obstacle is at least partly obscuring the microwave antenna 5.

The network node 3 may be configured to perform the above steps, and implement any of the described embodiments of the method 40, e.g. by comprising one or more processors 50 (or processing circuitry) and memory 51, the memory 51 containing instructions executable by the processor 50, whereby the network node 3 is operative to perform the steps.

In an embodiment thus, a network node 3 for restoring a microwave link is provided. The network node 3 comprises one or more processors 50 and memory 51, the memory 51 containing instructions executable by the processor 50, whereby the network node is operative to: detect that an obstacle is at least partly obscuring the microwave antenna 5, and send, to a network entity 7, information indicating that an obstacle is at least partly obscuring the microwave antenna 5.

In an embodiment, the network node 3 is configured to detect by detecting deterioration of microwave backhaul link 1 to a neighboring network node 2.

In different embodiments, the network node 3 is configured to detect based on one or more of: temperature, performance of microwave antenna 5, statistics on ice building on the microwave antenna 5.

In various embodiments, the network node 2 is configured to send with the information indicating that an obstacle is at least partly obscuring the microwave antenna 5 also one or both of: an identification identifying the network node 3 and geographical coordinates of the network node 3.

Figure 7:
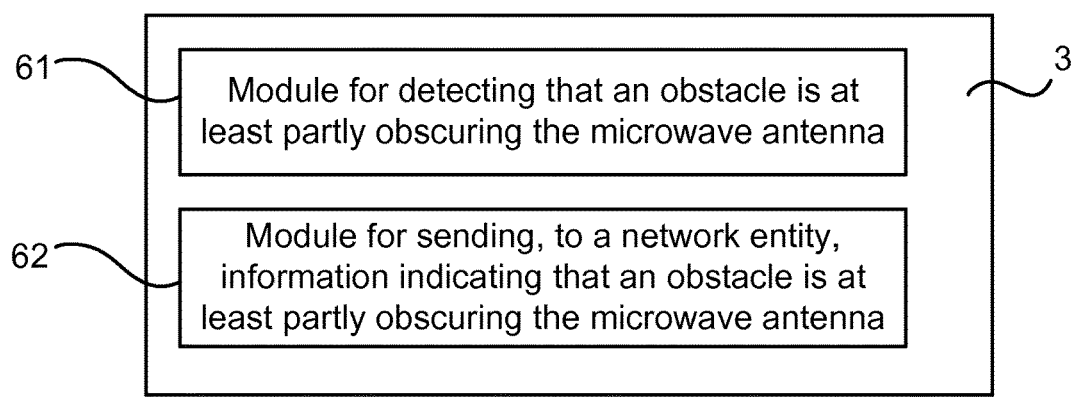
FIG. 7 illustrates a node comprising function modules/software modules for implementing embodiments of the present teachings.

FIG. 7 illustrates a node comprising function modules/software modules for implementing embodiments of the present teachings. The function modules can be implemented using software instructions such as computer program executing in a processor and/or using hardware, such as application specific integrated circuits (ASICs), field programmable gate arrays, discrete logical components etc., and any combination thereof. Processing circuitry may be provided, which may be adaptable and in particular adapted to perform any of the steps of the method 40 that has been described in various embodiments.

A network node 3 is provided for restoring a microwave link. The network node 3 is arranged to control a microwave antenna 5, providing for instance a backhaul link. The network node 3 comprises a first module 61 for detecting that an obstacle is at least partly obscuring the microwave antenna 5. The first module 61 may, for instance, comprise processing circuitry adapted to receive input such as e.g. deteriorating link performance, performance of the microwave antenna, statistics on ice building on the microwave antenna and temperature, and detecting based thereon that the obstacle is at least partly obscuring the microwave antenna.

The network node 3 comprises a second module 62 for sending, to a network entity, information indicating that an obstacle is at least partly obscuring the microwave antenna. The second module 62 may, for instance, comprise receiving circuitry or an input device.

The network node 3 may also comprise one or more modules for being capable receiving and processing a combination of input, e.g. inputs relating to detection of an obstacle at least partly obscuring the microwave antenna and data from a database.

It is noted that one or both of the modules 61, 62 may be replaced by units.

Figure 8:
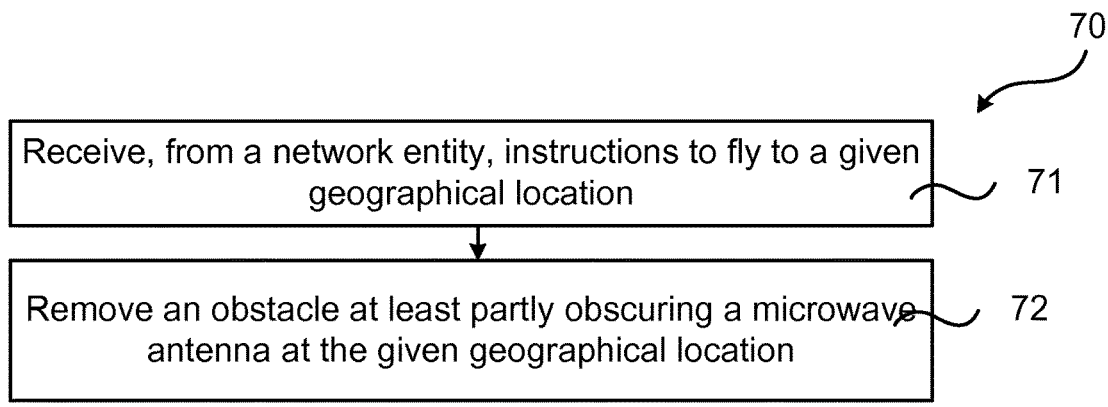
FIG. 8 illustrates a flow chart over steps of an embodiment of a method an unmanned aerial vehicle in accordance with the present teachings.

FIG. 8 illustrates a flow chart over steps of an embodiment of a method an unmanned aerial vehicle in accordance with the present teachings. The method 70 is performed by an unmanned aerial vehicle 6 for restoring a microwave link 1.

The method 70 comprises receiving 71, from a network entity 7, instructions to fly to a given geographical location. In response thereto, the unmanned aerial vehicle 6 flies to the given geographical location.

The method 70 comprises removing 72 an obstacle at least partly obscuring a microwave antenna 5, the microwave antenna 5 residing at the given geographical location. That is, when arriving at the location, the unmanned aerial vehicle 6 removes the obstacle, e.g. deicing the microwave antenna or other means, depending on the obstacle at hand.

In an embodiment, the removing 72 comprises deicing the microwave antenna 5.

In different embodiments, the deicing comprises one or more of: spraying a de-freeze substance, applying an electric blanket on the microwave antenna 5.

Figure 9:
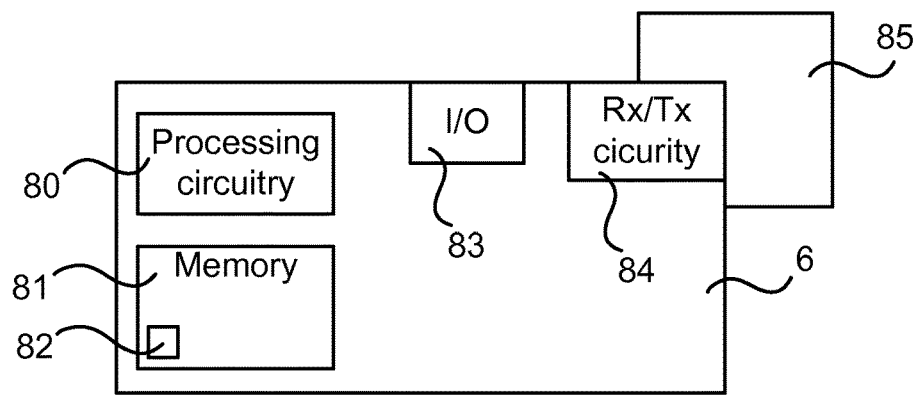
FIG. 9 illustrates schematically an unmanned aerial vehicle and means for implementing embodiments of the method in accordance with the present teachings.

FIG. 9 illustrates schematically an unmanned aerial vehicle and means for implementing embodiments of the method in accordance with the present teachings. The unmanned aerial vehicle 6 may comprise processing circuitry 80, which may be any combination of one or more of a suitable central processing unit (CPU), multiprocessor, microcontroller, digital signal processor (DSP), etc., capable of executing software instructions stored in a computer program product 81, e.g. in the form of a storage medium 81. The processing circuitry 80 may further be provided as at least one application specific integrated circuit (ASIC), or field programmable gate array (FPGA).

The processing circuitry 80 is configured to cause the unmanned aerial vehicle 6 to perform a set of operations, or steps, e.g. as described in relation to FIG. 8. For example, the storage medium 81 may store the set of operations, and the processing circuitry 80 may be configured to retrieve the set of operations from the storage medium 81 to cause the unmanned aerial vehicle 6 to perform the set of operations. The set of operations may be provided as a set of executable instructions. The processing circuitry 80 is thereby arranged to execute methods as disclosed herein.

The storage medium 81 may also comprise persistent storage, which, for example, can be any single one or combination of magnetic memory, optical memory, solid state memory or even remotely mounted memory.

The unmanned aerial vehicle 6 also comprises an input/output means 83 for communicating wirelessly with other entities and devices. The input/output means 83 may, for instance, comprise a protocol stack, for wireless communication with a network node 3. The input/output means 83 may be used for receiving data input and for outputting data, e.g. receiving information and instructions from the network node 3 and/or sending information. The unmanned aerial vehicle 6 may comprise receiving circuitry and transmitting circuitry 84. The unmanned aerial vehicle 6 may also comprise an antenna device 85 for wireless communication. The unmanned aerial vehicle 6 also comprises means for removing an obstacle from an antenna device 5 controlled e.g. by the network node 3. Such means may, for instance, comprise control device and/or control circuitry for spraying a de-freeze substance, or mechanical means for applying an electric blanket on the microwave antenna 5, such as, for instance, a robotic arm or gripper.

An unmanned aerial vehicle 6 is provided for restoring a microwave link 1. The unmanned aerial vehicle 6 is configured to:

receive, from a network entity 7 instructions to fly to a given geographical location, and remove an obstacle at least partly obscuring a microwave antenna 5, the microwave antenna 5 residing at the given geographical location.

The unmanned aerial vehicle 6 may be configured to perform the above steps, and implement any of the described embodiments of the method 70, e.g. by comprising one or more processors 80 (or processing circuitry) and memory 81, the memory 81 containing instructions executable by the processor 80, whereby the unmanned aerial vehicle 6 is operative to perform the steps.

In an embodiment thus, a unmanned aerial vehicle 6 for restoring a microwave link is provided. The unmanned aerial vehicle 6 comprises one or more processors 80 and memory 81, the memory 81 containing instructions executable by the processor 80, whereby the unmanned aerial vehicle is operative to: receive, from a network entity instructions to fly to a given geographical location, and remove an obstacle at least partly obscuring a microwave antenna, the microwave antenna residing at the given geographical location.

In an embodiment, the unmanned aerial vehicle 6 is configured to remove by deicing the microwave antenna 5.

In an embodiment, the unmanned aerial vehicle 6 is configured to device by one or more of: spraying a de-freeze substance, applying an electric blanket on the microwave antenna 5.

Figure 10:
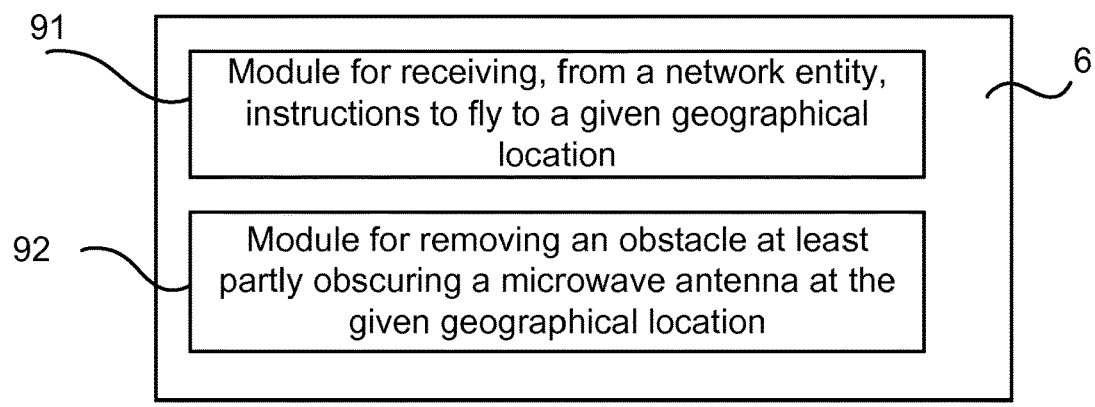
FIG. 10 illustrates an unmanned aerial vehicle comprising function modules/software modules for implementing embodiments of the present teachings.

FIG. 10 illustrates an unmanned aerial vehicle comprising function modules/software modules for implementing embodiments of the present teachings. The function modules can be implemented using software instructions such as computer program executing in a processor and/or using hardware, such as application specific integrated circuits (ASICs), field programmable gate arrays, discrete logical components etc., and any combination thereof. Processing circuitry may be provided, which may be adaptable and in particular adapted to perform any of the steps of the method 70 that has been described in various embodiments.

An unmanned aerial vehicle 6 is provided for restoring a microwave link 1. The unmanned aerial vehicle 6 comprises a first module 91 for receiving, from a network entity instructions to fly to a given geographical location. Such first module 91 may, for instance, comprise receiving circuitry or an input device.

The unmanned aerial vehicle 6 comprises a second module 92 for removing an obstacle at least partly obscuring a microwave antenna, the microwave antenna residing at the given geographical location receiving. Such second module 92 may, for instance, comprise a robotic arm or gripper and control circuitry for controlling the robotic arm or gripper such as to remove the obstacle.

The unmanned aerial vehicle 6 may also comprise one or more modules for being capable receiving and processing a combination of input, e.g. inputs relating to progress on removal on an obstacle at least partly obscuring the microwave antenna and/or data from a database.

It is noted that one or both of the modules 91, 92 may be replaced by units.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method for restoring a microwave link, the method being performed by a network entity and comprising:

receiving information from a node controlling a microwave antenna, the information indicating that an obstacle is at least partly obscuring the microwave antenna, and instructing, based on the received information, an unmanned aerial vehicle adapted for maintenance work to fly to a given location for removing the obstacle on the microwave antenna.

2. The method of claim 1, wherein the information indicating that an obstacle is at least partly obscuring the microwave antenna comprises one or more of: temperature at the vicinity of the microwave antenna, performance indicator of a microwave link provided by the microwave antenna, and weather forecasts at the location of the microwave antenna.

3. The method of claim 1, wherein the receiving information from the node further comprises one or both of: information identifying the node or information on location of node.

4. The method of claim 1, comprising detecting that the unmanned aerial vehicle is low on battery and instructing the unmanned aerial vehicle to fly to a charging station.

5. The method of claim 1, wherein the obstacle comprises one or both of ice and snow.

6. The method of claim 1, instructing the unmanned aerial vehicle to take preventive action by instructing it to remove ice on the microwave antenna.

7. A computer program product comprising a non-transitory computer readable medium storing a computer program for a network entity for restoring a microwave link, the computer program comprising computer program code, which, when run on at processing circuitry of the network entity causes the network entity to perform the method of claim 1.

8. A network entity for restoring a microwave link, the network entity being configured to:

receive information from a node controlling a microwave antenna, the information indicating that an obstacle is at least partly obscuring the microwave antenna, and instruct, based on the received information, an unmanned aerial vehicle adapted for maintenance work to fly to a given location for removing the obstacle on the microwave antenna.

9. The network entity as claimed in claim 8, wherein the information indicating that an obstacle is at least partly obscuring the microwave antenna comprises one or more of: temperature at the vicinity of the microwave antenna, performance indicator of a microwave link provided by the microwave antenna, and weather forecasts at the location of the microwave antenna.

10. The network entity as claimed in claim 8, wherein the information from the node further comprises one or both of: information identifying the node or information on location of node.

11. The network entity as claimed in claim 8, configured to detect that the unmanned aerial vehicle is low on battery and to instruct the unmanned aerial vehicle to fly to a charging station.

12. The network entity as claimed in claim 8, wherein the obstacle comprises one or both of ice and snow.

13. The network entity as claimed in claim 8, configured to instruct the unmanned aerial vehicle to take preventive action by instructing it to remove ice on the microwave antenna.

14. A network node for restoring a microwave link, the network node controlling a microwave antenna and being configured to:
 detect that an obstacle is at least partly obscuring the microwave antenna, and
 send, to a network entity, information indicating that an obstacle is at least partly obscuring the microwave antenna.

15. The network node of claim 14, configured to detect by detecting deterioration of microwave backhaul link to a neighboring network node.

16. The network node of claim 14, configured to detect based on one or more of: temperature, performance of microwave antenna, statistics on ice building on the microwave antenna.

17. The network node of claim 14, configured to send with the information indicating that an obstacle is at least partly obscuring the microwave antenna also one or both of: an identification identifying the network node and geographical coordinates of the network node.

18. A method for restoring a microwave link, the method comprising:
 a network entity receiving information from a node controlling a microwave antenna, the information indicating that an obstacle is at least partly obscuring the microwave antenna;
 the network entity instructing, based on the received information, an unmanned aerial vehicle adapted for maintenance work to fly to a given geographical location for removing the obstacle on the microwave antenna;
 the unmanned aerial vehicle flying to the given geographical location; and
 the unmanned aerial vehicle removing the obstacle at least partly obscuring the microwave antenna, the microwave antenna residing at the given geographical location.

19. The method of claim 18, wherein removing the obstacle comprises removing the obstacle by deicing the microwave antenna.

20. The method of claim 19, wherein deicing the microwave antenna comprises one or more of: spraying a defreeze substance or applying an electric blanket on the microwave antenna.

\* \* \* \* \*